United States Patent [19]

Thistleton

[11] Patent Number: 4,525,128
[45] Date of Patent: Jun. 25, 1985

[54] RECIPROCATING EXHAUSTER

[75] Inventor: John S. Thistleton, Lincoln, England

[73] Assignee: Clayton Dewandre Co., Ltd., Lincoln, England

[21] Appl. No.: 502,839

[22] Filed: Jun. 9, 1983

[51] Int. Cl.³ .............................................. F04B 21/00
[52] U.S. Cl. .................................. 417/550; 123/198 C
[58] Field of Search ................. 123/320, 198 C, 198 P; 417/545, 550; 91/422

[56] References Cited

U.S. PATENT DOCUMENTS 2,012,819  8/1935  Hueber et al. ...................... 417/550
2,032,321  2/1936  Hueber et al. ...................... 417/550

FOREIGN PATENT DOCUMENTS 841275  7/1960  United Kingdom .
2003990  3/1979  United Kingdom .

Primary Examiner—William A. Cuchlinski, Jr.
Attorney, Agent, or Firm—G. P. Baier

[57] ABSTRACT

A reciprocating, preferably a piston-type, exhauster adapted for mounting on an engine crankcase and having, on opposite sides of the piston, a high clearance volume inlet chamber and a low clearance volume exhaust chamber. The piston is operated by an engine driven cam acting on the piston rod which passes through the exhaust chamber and moves against a return spring in the inlet chamber. As the piston moves in the cylinder air is drawn from the inlet chamber through a non-return valve in the piston to the exhaust chamber and then is discharged directly into the engine crankcase.

7 Claims, 5 Drawing Figures

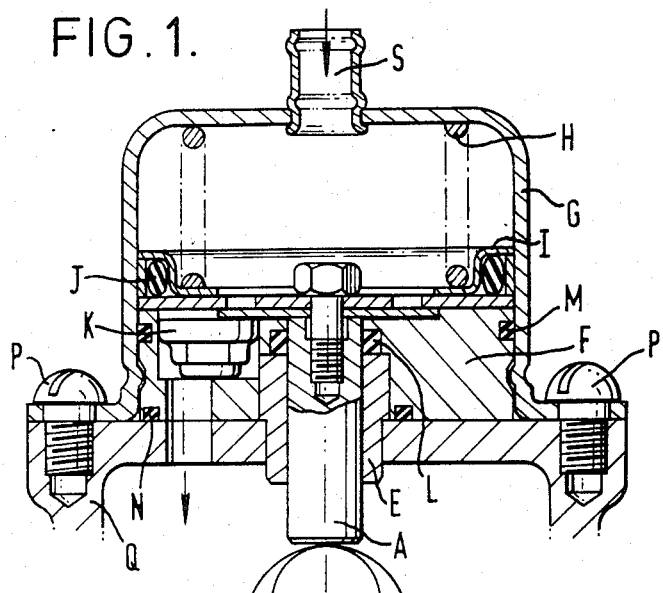
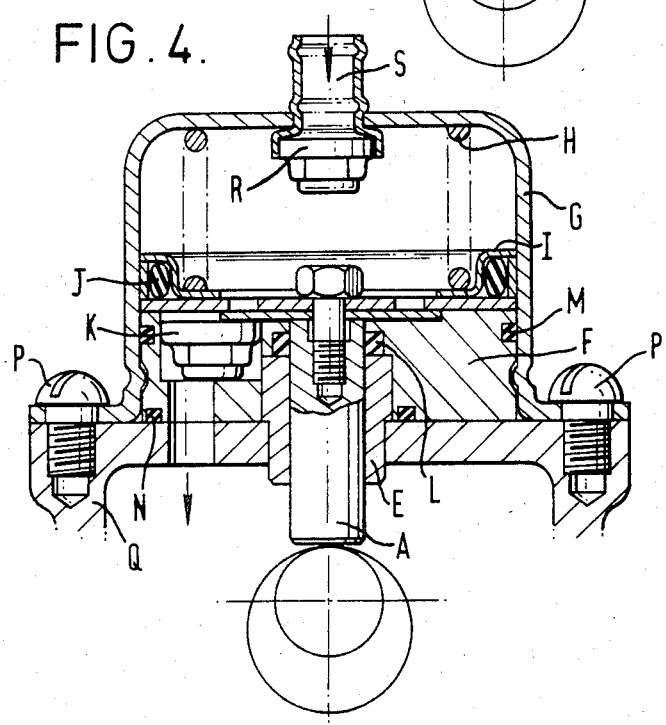

RECIPROCATING EXHAUSTER

This invention relates to a reciprocating exhauster of the kind used to provide vacuum to operate a vehicle braking servo predominantly on vehicles driven by diesel engines.

Such exhausters are known which are operated by an engine-driven cam acting on the piston or push rod. Normally, an inlet valve, which may be a reed-type or disc-type valve, is fitted in the connection between the vacuum reservoir and the cylinder; and an exhaust valve in communication with the clearance volume (i.e. cylinder volume at top dead centre) is fitted in the cylinder casing. The performance of such exhausters depends to a considerable extent upon the size of the clearance volume which is critically affected by component tolerances.

British Patent specification No. 2,003,990A discloses a vacuum pump or exhauster which is driven by the engine cam shaft and includes a reciprocable pump member operable to withdraw air from an inlet and expel it to atmosphere. The pump member which may be a diaphragm or a piston divides the cylinder body into an inlet chamber and an outlet chamber, the body and the pump member being so shaped as to minimize the clearance volume of the inlet chamber which is the primary pumping chamber. Air passes through a check valve in a flow path through the pump member, to the exhaust chamber which has a relatively large minimum volume intended to increase the pump efficiency while at the same time reducing the noise attributable to gas discharge from the primary pumping chamber.

According to the present invention, we propose a reciprocating exhauster for mounting on an engine casing to be driven by the engine and comprising a pump member working in a cylinder body so as to define on opposite sides thereof an inlet chamber having an inlet for connection to a vacuum reservoir, and an exhaust chamber having an outlet fitted with an exhaust valve, and a valve arranged to permit fluid to flow from the inlet chamber to the exhaust chamber, wherein the pump member and the cylinder body are shaped to minimize the clearance volume of the exhaust chamber.

As in conventional reciprocating exhausters, the pump member, usually a piston, may be driven by a cam acting directly on the piston rod which, preferably, passes through the exhaust chamber. Further, the piston is conveniently biased into contact with the cam by a return spring disposed in the inlet chamber. Preferably, the inlet to the inlet chamber is fitted with a non-return valve which serves to increase the efficiency of the exhauster. If, however, no non-return valve is fitted the inlet chamber effectively provides additional vacuum reservoir capacity. Further, the invention enables a simpler and cheaper construction due, in part, to the relative ease with which component tolerances can be controlled, than is possible with conventional piston exhausters and in which different strokes can be accomodated with minimal component changes.

The present invention, therefore, differs from the exhauster disclosed in British Patent specification No. 2,003,990 in that the flow through the two chambers of different clearance volumes is in the opposite direction. That is: the air first enters the chamber with high clearance volume and not as in BP No. 2,003,990, the low clearance volume chamber. The exhaust chamber is the main pumping chamber.

In the preferred embodiment the exhaust port is positioned on the piston or push rod side of the exhaust chamber, this having an advantage in that the exhaust air can be discharged directly into the engine crankcase on which the exhauster is mounted, so avoiding the problem of noise generated by the exhaust valve, and the inlet is conveniently located away from the mounting flange. Also, this arrangement enables the exhauster according to the present invention to be more compact than conventional exhausters and facilitates the admission to the pumping chamber of oil from the crankcase for sealing and lubrication. The oil is then returned to the crankcase with the exhaust air. In a piston exhauster arranged as described in British Pat. No. 2,003,990 oil entering the pump chamber would be discharged into the atmosphere unless an additional pipe is connected between the exhaust port and the crankcase.

Embodiments of the invention will now be described by way of example with reference to the accompanying drawings of which:

FIG. 1 is a cross-section of a piston exhauster;

FIG. 4 is a cross-section of a piston exhauster similar to that shown in FIG. 1 but having a non-return valve fitted in the inlet port.

Figure 2:
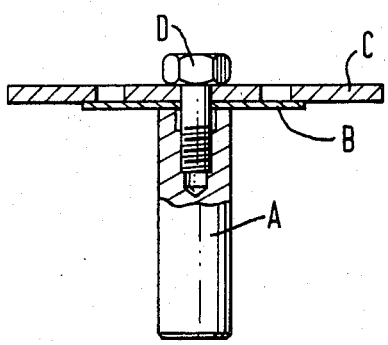
FIG. 2 is a cross-section of the piston of the exhauster shown in FIG. 1.
Figure 3:
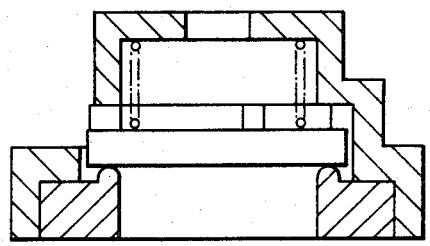
FIG. 3 is a cross-section of the exhaust valve of the exhauster shown in FIG. 1.

With reference to FIGS. 1 to 3; the piston exhauster is bolted onto the engine crankcase Q through which passes a piston push rod, A within a bearing E and in engagement with an engine driven cam. The piston rod is sealed by a low-friction ring seal L.

Within the cylinder body G of the exhauster, which is cup-like pressing, is a piston C bolted to the piston rod A and carrying a low-friction piston ring seal J held by a floating retainer I upon which a return spring H acts directly so clamping the seal J. Above the piston C is a high clearance volume inlet chamber in direct communication with a vacuum reservoir (not shown) via a pipe S and the spaced created between the piston C and the base block F as the piston works within the cylinder G moving away from the position (equivalent to top-dead centre) illustrated, is a low clearance volume exhaust chamber communicating with the interior of the crankcase Q via an exhaust valve K which may be a disc-type check or non-return valve, such as shown in FIG. 3, inletted into a recess in the base block F.

The pressing G is secured to the block F by crimping, accurate machining of the pressing G therefore being unnecessary since, provided the block F is accurately machined, the block F serves to size the cylinder bore during assembly to provide a good piston seal. Static O-ring seals M and N are fitted between the pressing G and the external diameter of the block F, and between the block F and the engine crankcase Q, respectively.

As shown more clearly in FIG. 2, a disc or flap valve B is clamped between the piston C and piston rod A so as to cover four equally angularly spaced holes passing through the piston. In the position (top-dead centre) shown in FIG. 1, the valve B is received within a recess in the block F so minimizing the clearance volume of the exhaust chamber.

In operation, as the cam turns, the piston rod A and piston and seal assembly (B, C, D, I and J) are displaced upwardly against the action of the return spring H, thus creating a partial vacuum on the lower pressure side of the piston (i.e. in the exhaust chamber). The disc or flap-valve B opens to admit, through the four spaced holes, air from the inlet chamber (in communication with the vacuum reservoir), to the exhaust chamber. As the cam continues to rotate, the piston is driven downwardly by the return spring H to exhaust air in the exhaust chamber through the check valve K directly into the engine crankcase.

The performance of exhausters in general, and the above-described exhauster in particular, is affected by the size of the clearance volume in the main pumping chamber, in this case the exhaust chamber, and this is critically affected by component tolerances particularly where the piston stroke is small. In the embodiment illustrated in FIGS. 1 to 3, the tolerances on the thickness of block F and the length of the piston rod A control the closest approach of the piston C to the block F and hence the clearance volume. Both of the components A and F are designed so that the relevant dimensions can be cheaply controlled in production.

With the crankcase mounting shown in FIG. 1 (i.e. using bolts P into the engine flange) the block F may be allowed to protrude slightly from the cylinder body pressing G so that when mounting the exhauster the bolts P draw the cylinder body pressing to the crankcase flange ensuring that the block F is in contact with the flange.

In the piston exhauster shown in FIG. 4, a disc-type or non-return valve R is fitted in the pipe S connected to the vacuum reservoir. We believe, that this arrangement yields an increase in efficiency but equally important, it serves to prevent oil passing in to the vacuum reservoir.

Figure 5:
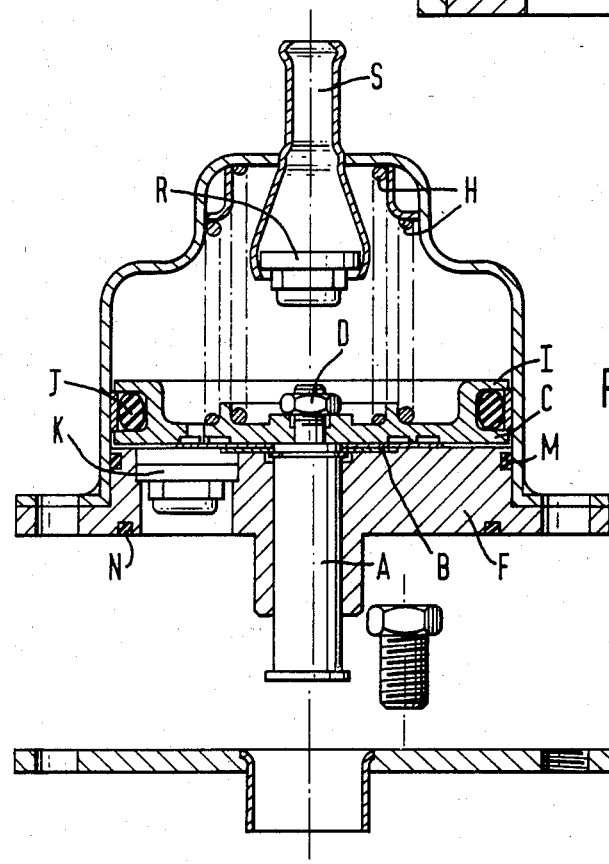
FIG. 5 is a cross-section of another piston exhauster similar, in principle, to the exhauster shown in FIG. 4.

FIG. 5 shows another embodiment of piston exhauster which is similar in principle to the exhauster of FIG. 4, but in which the bearing E is replaced by a bore in the block F, and the seal L is omitted. Also, the piston is of a one piece construction and the flap valve B which covers two annular grooves in the face of the piston has a supporting washer.

I claim:

1. A reciprocating exhauster for mounting on an engine casing to be driven by the engine and comprising a pump member working in a cylinder body so as to define on opposite sides thereof an inlet chamber having an inlet for connection to a vacuum reservoir, and an exhaust chamber having an outlet fitted with an exhaust valve, and a valve arranged to permit fluid to flow from the inlet chamber to the exhaust chamber, the pump member and cylinder body being shaped to minimize the clearance volume of the exhaust chamber wherein the clearance volume of said exhaust chamber is substantially less than the clearance volume of said inlet chamber.

2. An exhauster according to claim 1 wherein the pump member is driven against a return spring disposed in the inlet chamber by a push rod passing through the exhaust chamber.

3. An exhauster according to claim 2 wherein the exhaust valve is disposed on the push rod side of the exhaust chamber.

4. An exhauster according to claim 1 wherein the inlet is fitted with a non-return valve.

5. An exhauster according to claim 1 and mounted or adapted for mounting on the crankcase of an engine such that a push rod for driving the pump member against the return spring in the inlet chamber, extends through the exhaust chamber and out from the cylinder body for engagement with an engine driven cam or other operating means and the exhaust outlet discharges directly into the engine crankcase.

6. An exhauster according to claim 1 wherein the clearance volume of said inlet chamber is large compared to a lower clearance volume of said exhaust chamber.

7. An exhauster according to claim 1 wherein said exhaust valve comprises a check valve inletted into a recess in the base of said cylinder body adjacent the exhaust side of said piston.

* * * * *